(12) United States Patent
Li

(10) Patent No.: US 10,550,585 B1
(45) Date of Patent: Feb. 4, 2020

(54) ASSEMBLABLE PLATFORM MADE OF FIBER-REINFORCED PLASTIC (FRP)

(71) Applicant: Gold Water International Inc., Uncasville, CT (US)

(72) Inventor: Gui Li, Uncasville, CT (US)

( * ) Notice: Subject to any disclaimer, the term of this patent is extended or adjusted under 35 U.S.C. 154(b) by 0 days.

(21) Appl. No.: 16/168,781

(22) Filed: Oct. 23, 2018

(51) Int. Cl.
| | | |
|---|---|---|
| *E04F 19/06* | (2006.01) | |
| *E04F 15/02* | (2006.01) | |
| *B29C 70/18* | (2006.01) | |

(52) U.S. Cl.
CPC .......... *E04F 19/065* (2013.01); *B29C 70/18* (2013.01); *E04F 15/02038* (2013.01); *E04F 2201/0161* (2013.01); *E04F 2201/05* (2013.01)

(58) Field of Classification Search
CPC ... E04F 15/02038; E04F 19/065; E04F 70/18; E04F 220/0162; E04F 2201/05; E04F 2201/0161; B29C 70/18
USPC ...... 108/57.25, 56.1, 56.3, 54.1, 64; 52/263, 52/6, 7
See application file for complete search history.

(56) References Cited

U.S. PATENT DOCUMENTS

| | | | | |
|---|---|---|---|---|
| 2,699,977 A | * | 1/1955 | Breslow ................. | A47B 3/083 108/35 |
| 2,737,430 A | * | 3/1956 | Ess ........................ | A47B 13/08 108/64 |
| 2,851,311 A | * | 9/1958 | Gibbs ...................... | E04G 1/28 182/222 |
| 3,091,487 A | * | 5/1963 | Gallagher ............... | F16B 2/245 403/381 |
| 3,118,400 A | * | 1/1964 | Kemp, Jr. et al. ......... | B65D 19/0093 108/57.1 |
| 3,878,796 A | * | 4/1975 | Morrison ........... | B65D 19/0075 108/56.1 |
| 4,095,769 A | * | 6/1978 | Fengels .............. | B65D 19/0002 108/54.1 |
| 4,735,154 A | * | 4/1988 | Hemery ............. | B65D 19/0012 108/56.1 |
| 5,105,746 A | * | 4/1992 | Reynolds ........... | B65D 19/0012 108/54.1 |
| 5,178,075 A | * | 1/1993 | Kanazawa ......... | B65D 19/0069 108/56.1 |
| 5,809,902 A | * | 9/1998 | Zetterberg ......... | B65D 19/0069 108/51.11 |
| 5,868,080 A | * | 2/1999 | Wyler ................ | B65D 19/0022 108/57.25 |

(Continued)

*Primary Examiner* — Jose V Chen
(74) *Attorney, Agent, or Firm* — Dragon Sun Law Firm, PC; Jinggao Li, Esq.

(57) ABSTRACT

There is provided an assembleable platform made of fiber-reinforced plastic (FRP), including (1) a plurality of plates each having a first T-shaped slot on the top surface and a second T-shaped slot on the bottom surface along a first axis, and a third T-shaped slot on the right-side surface and a fourth T-shaped slot on the left-side surface both along the first axis and oriented perpendicular to the first axis, where the each plate is rectangular; (2) a plurality of T-shaped connectors disposed in the first T-shaped slot and the second T-shaped slot to connect the plurality of the plates; and (3) a plurality of I-beam connectors disposed in the third T-shaped slot and the fourth T-shaped slot to connect the plurality of plates to form the assembleable platform, wherein each of the plurality of plates, T-shaped connectors and I-beam connectors is made of FRP.

20 Claims, 16 Drawing Sheets

(56) References Cited

U.S. PATENT DOCUMENTS

| | | | |
|---|---|---|---|
| 6,263,807 B1 * | 7/2001 | Fox | B65D 19/0073 108/54.1 |
| 7,802,527 B2 * | 9/2010 | Dong | B65D 19/001 108/54.1 |
| 8,919,263 B2 * | 12/2014 | Jeong | A47B 13/088 108/64 |
| 2012/0111238 A1 * | 5/2012 | Frankenberg | B62B 5/0093 108/57.25 |
| 2012/0222588 A1 * | 9/2012 | Davis | E04H 3/28 108/64 |
| 2013/0014676 A1 * | 1/2013 | Imbrecht | B65D 19/18 108/57.25 |
| 2015/0113903 A1 * | 4/2015 | McManus | E04F 15/02044 52/586.1 |
| 2015/0321792 A1 * | 11/2015 | Joung | B65D 19/38 108/57.25 |
| 2018/0127988 A1 * | 5/2018 | Burczeck | E04F 15/08 |
| 2019/0203480 A1 * | 7/2019 | Garbelotto | E04F 15/02038 |

* cited by examiner

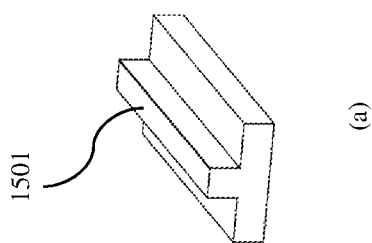
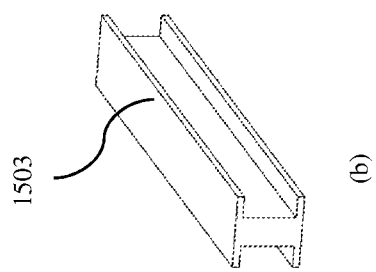
FIG. 15

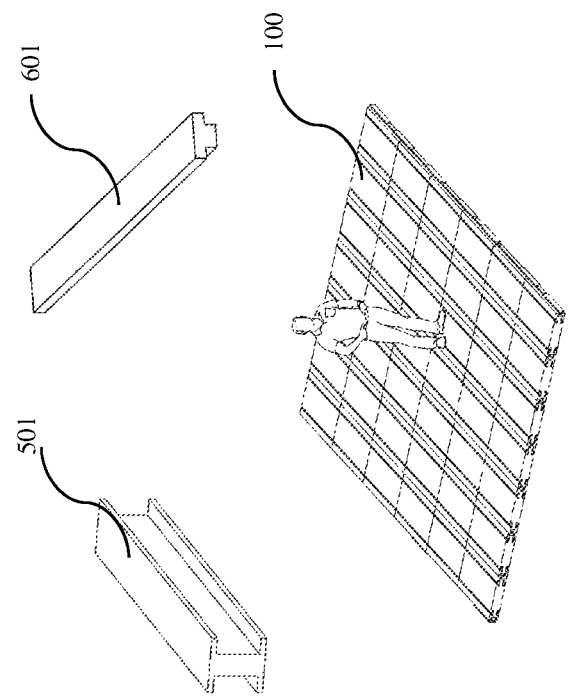
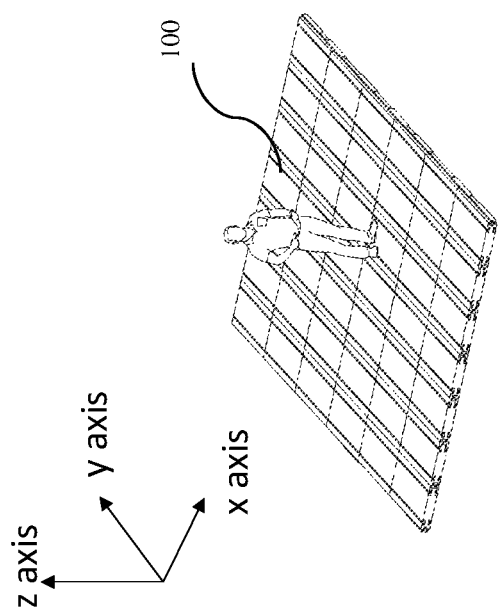
FIG. 16

ASSEMBLABLE PLATFORM MADE OF FIBER-REINFORCED PLASTIC (FRP)

FIELD OF THE INVENTION

The present disclosure relates to an platform, and in particular to an assemblable platform made of fiber-reinforced plastic (FRP).

BACKGROUND OF THE INVENTION

The background description provided herein is for the purpose of generally presenting the context of the present disclosure. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the present disclosure.

Water recreation, sports and fitness equipment usually need platforms. The platforms made of metal materials are always heavy and not weather-resistant. The platforms made of, for example, plastics are normally lack of strength and stiffness to support heavy duty.

Fiber-reinforced plastic (FRP) is formed of a resin that is subsequently reinforced by a fibrous material that is composed of reinforcing fibers such as carbon fibers or glass fibers. FRP is a well-known material. However, it has not been reported that an assembleable platform made of the FRP exists in the market.

Therefore, a heretofore unaddressed need exists in the art to address the aforementioned deficiencies and inadequacies.

SUMMARY OF THE INVENTION

These and other aspects of the present disclosure will become apparent from the following description of the preferred embodiment taken in conjunction with the following drawings, although variations and modifications therein may be affected without departing from the spirit and scope of the novel concepts of the disclosure.

The present disclosure provides an assembleable platform made of fiber-reinforced plastic (FRP), inclining: a plurality of plates each comprising a first T-shaped slot on the top surface and a third T-shaped slot on the bottom surface along a first axis, and a third T-shaped slot on the right-side surface and a fourth T-shaped slot on the left-side surface along the first axis and orientated perpendicular to the first axis, where the each plate is rectangular; a plurality of T-shaped connectors disposed in the first T-shaped slot and the second T-shaped slot to connect the plurality of the plates; a plurality of I-beam connectors disposed in the third T-shaped slot and the fourth T-shaped slot to connect the plurality of plates to form the assembleable platform, wherein each of the plurality of plates, the plurality of T-shaped connectors and the plurality of I-beam connectors has the same or substantially the same thickness and is made of FRP.

In one embodiment, each of the plurality of plates has a fifth T-shaped slot on the top surface and a sixth T-shaped slot on the bottom surface.

In one embodiment, the clearance between each T-shaped connector and each T-shaped slot is within 0.1 mm when the each T-shaped connector is disposed on the each T-shaped slot; and the clearance between each I-beam connector and each T-shaped slot is within 0.2 mm when the each I-beam connector is disposed in the each slot.

In one embodiment, the each plate has a length, and the length is about 800.0 mm.

In one embodiment, the each plate has a thickness, and the thickness is about 100.0 mm.

In one embodiment, the each plate has a central cavity, and the central cavity is filled with either polystyrene (PU) or expanded polystyrene (EPS) through a foaming process.

In one embodiment, each I-beam connector has a central cavity, and the central cavity is filled with PU or EPS through the foaming process.

In one embodiment, each T-shaped connector has a central cavity, and the central cavity is filled with PU or EPS through the foaming process.

In one embodiment, at least one of the first, the second, the third, the fourth, the fifth, and the sixth plates has a clearance hole disposed on a corresponding T-shaped slot, and the clearance hole is to insert a first pin.

In one embodiment, the each I-beam connectors has at least one through hole, and the through hole is to mechanically fix the each connector with a first corresponding plate by a second pin.

In one embodiment, the each T-shaped connector has at least one through hole, and the through hole is to mechanically fix the each T-shaped connector with a second corresponding plate through a third pin.

In one embodiment, the assembleable platform further includes at least two T-shaped connectors made of a compressible material, wherein the at least two T-shaped connectors made of the compressible material are disposed in one of T-shaped slots of plates of the assembleable platform to prevent T-shaped connectors made of FRP from moving along the T-shaped slots of the plates.

In one embodiment, the each T-shaped connector made of FRP has one T-shaped connector made of the compressible material disposed one each side so that the one T-shaped connector made of the compressible material can be used to prevent movement of the each T-shaped connector made of FRP.

In one embodiment, the assembleable platform of claim 12, wherein the each I beam connector made of FRP has one I beam connector made of the compressible material disposed one each side so that the one I beam connector made of the compressible material can be used to prevent any movement of the each T-shaped connector in a first corresponding T-shaped slot.

In one embodiment, the assembleable platform of claim 14, further comprising an I-beam connector made of the compressible material, wherein the I-beam connector made of the compressible material is disposed in one of T-shaped slots of plates of the assembleable platform to prevent I-beam connectors made of FRP from moving along the one of T-shaped slots of the plates.

In one embodiment, the assembleable platform of claim 15, wherein the assembleable platform has a total length greater than 2.0 meters and a total thickness greater than 100.0 mm, and the assembleable platform has a buoyance force when the assembleable platform is put in the water and the buoyance force is large enough to support at least a person with a weight over 300 lb.

In one embodiment, the assembleable platform of claim 16, wherein reinforcing material of the FRP is basalt fiber.

In one embodiment, the assembleable platform has at least one layer, and plates on a top layer are connected with plates of the adjacent layer under the top layer through I-beam connectors.

In one embodiment, the assembleable platform can be connected with another assembleable platform by another plurality of T-shaped connectors in either an X axis or a y-axis direction.

BRIEF DESCRIPTION OF THE DRAWINGS

The accompanying drawings illustrate one or more embodiments of the present disclosure and, together with the written description, serve to explain the principles of the invention. Wherever possible, the same reference numbers are used throughout the drawings to refer to the same or like elements of an embodiment.

FIG. 15(a) is a front and side perspective view of one embodiment of a T-shaped connector made of compressible material.

FIG. 15(b) is a front and side perspective view of one embodiment of an I-beam connector made of compressible material.

FIG. 16 shows a method of assembling the assembleable platform.

DESCRIPTION OF THE PREFERRED EMBODIMENTS

Figure 1:
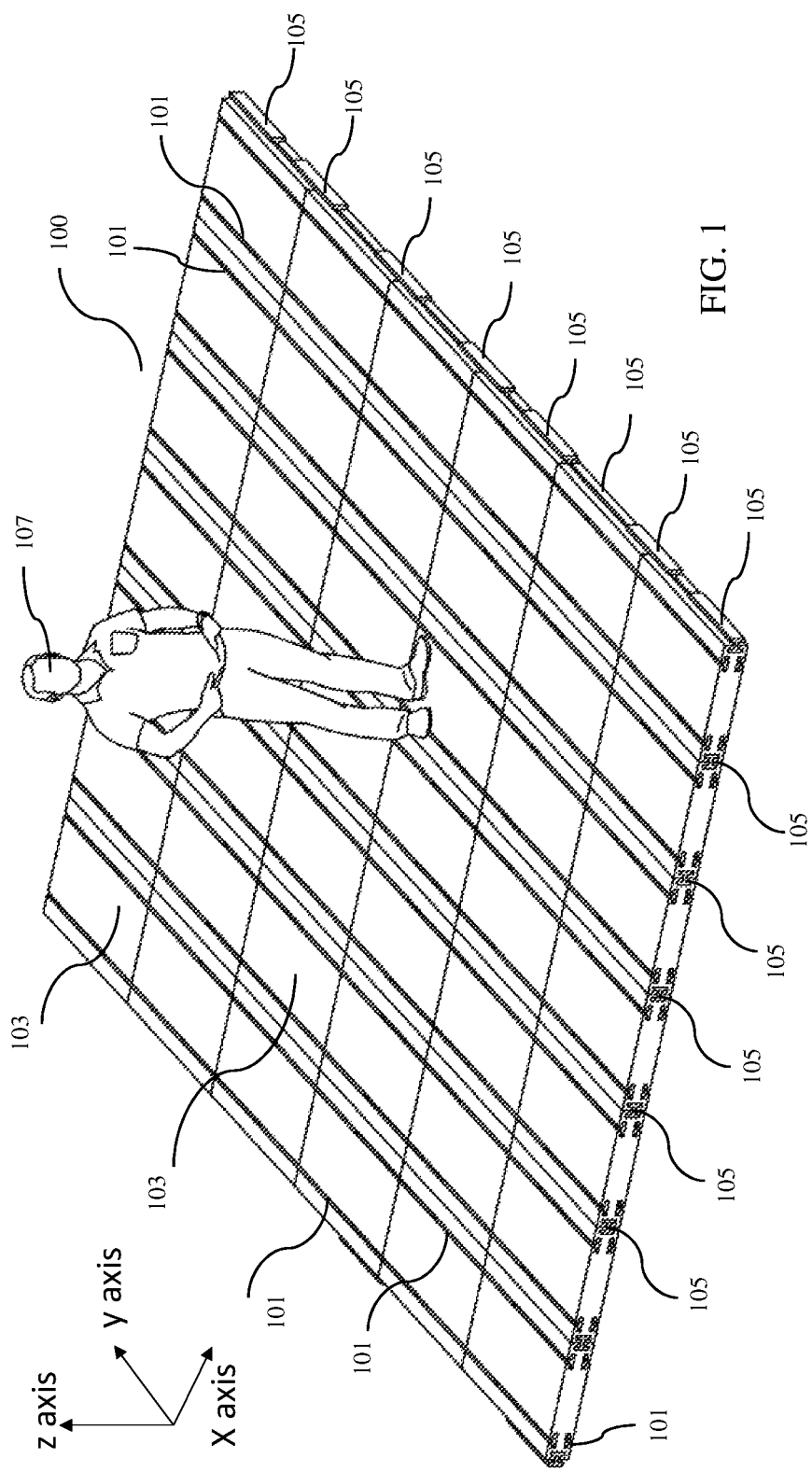
FIG. 1 is a front and side perspective view of assembleable platform.

The present disclosure will now be described more fully hereinafter with reference to the accompanying drawings, in which exemplary embodiments of the present disclosure are shown.

The present disclosure may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It is appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the invention or of any exemplified term. Likewise, the invention is not limited to various embodiments given in this specification.

It is understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It is understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the present disclosure.

It is understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It is also appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the invention. As used herein, the singular forms "a," "an," and "the" are intended to include the plural forms as well, unless the context clearly indicates otherwise. It is further understood that the terms "comprises" and/or "comprising," or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It is understood that relative terms are intended to encompass different orientations of the device in addition to the orientation shown in the figures. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present disclosure belongs. It is further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around," "about," "substantially" or "approximately" shall generally mean within 20 percent, preferably within 10 percent, and more preferably within 5 percent of a given value or range. Numerical quantities given herein are approximate, meaning that the terms "around," "about," "substantially" or "approximately" can be inferred if not expressly stated.

As used herein, the terms "comprise" or "comprising," "include" or "including," "carry" or "carrying," "has/have" or "having," "contain" or "containing," "involve" or "involving" and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the invention.

Embodiments of the invention are illustrated in detail hereinafter with reference to accompanying drawings. It should be understood that specific embodiments described herein are merely intended to explain the invention, but not intended to limit the invention. In accordance with the purposes of this invention, as embodied and broadly described herein, this invention, in certain aspects, relates to an assemblable platform made of fiber-reinforced plastic (FRP).

Specifically, the present disclosure discloses an assembleable platform made of fiber-reinforced plastic. The assembleable platform made of fiber-reinforced plastic comprises at least one layer of a set of core plates. The assembleable platform adopts at least one layer as a reinforced structure of a core part, and thus the comprehensive mechanical property of the assembleable platform made of FRP is enhanced. The width, the length and the height of the assembleable platform can be different depending on the design requirements. The buoyancy is good for at least one adult with safety, and the sport sliding plate is convenient for riders to drive and control.

FIG. 1 is a front and side perspective view of an assembleable platform. Referring to FIG. 1, assembleable platform 100 includes a plurality of plates 103 along an x-axis and a plurality of plates 103 along a y axis, a plurality of T-shaped connectors 101 connecting the plurality of plates 103 along the y axis and a plurality of I-beam connectors 105 connecting the plurality of plates 103 along the x axis direction. The number of plates 103 is at least 3 in the axis direction, and the number of plates 104 is at least 3 in the y-axis direction. Dimensions of platform 100 are required to be large enough to support more than the weight of one adult person 107 when platform 100 is put in the water or set up as a supporting structure. Assembleable platform 100 can be stacked in an Z-axis direction with a plurality of I-beam connectors 105. In this case, assembleable platform 100 has at least two layers. In one embodiment, assembleable platform 100 can have three layers or more than three layers to satisfy the design requirements.

Figure 2:
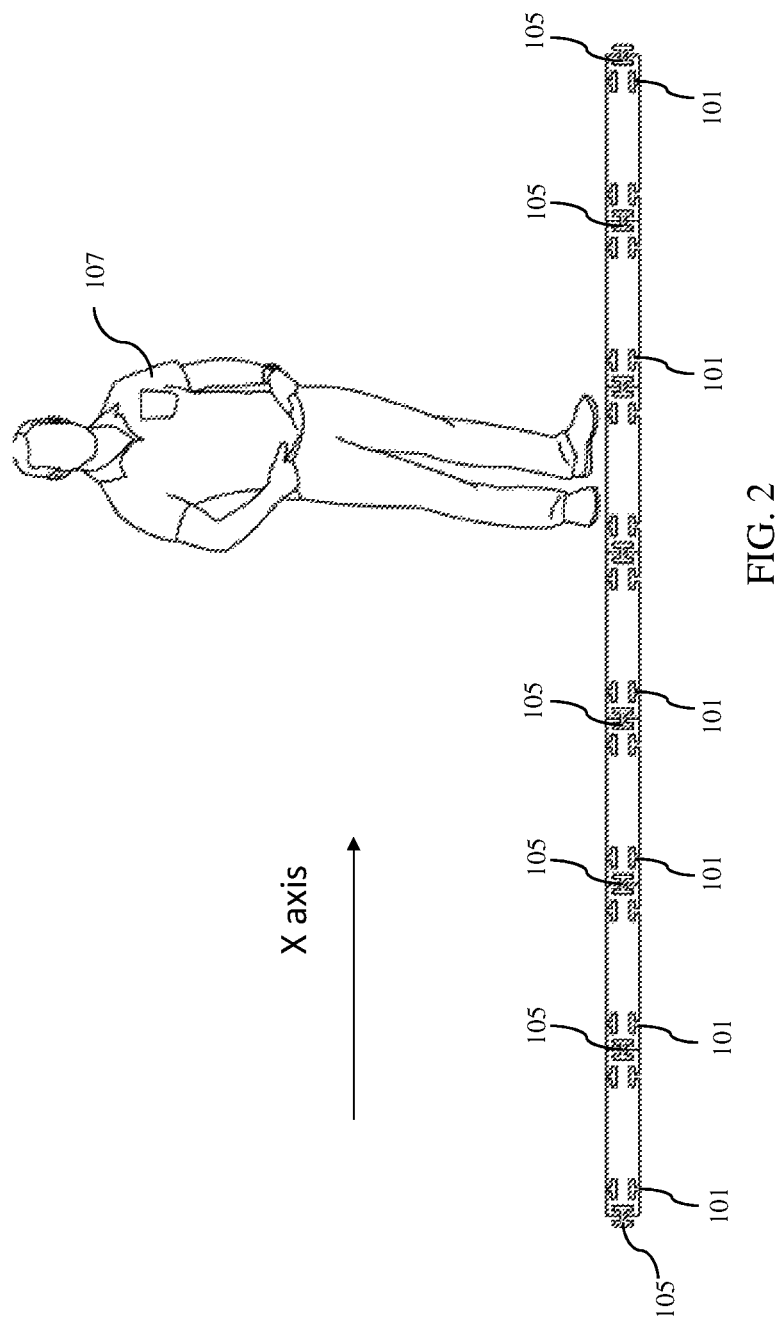
FIG. 2 is a front view of the assembleable platform in FIG. 1.

Referring to FIG. 2, in one embodiment, assembleable platform 100 includes seven plates 103 in the x-direction and eight I-beam connector 105 and twenty-eight T-shaped connectors 101. Assembleable platform 100 has a buoyance force to support more than the weight of one adult.

Figure 3:
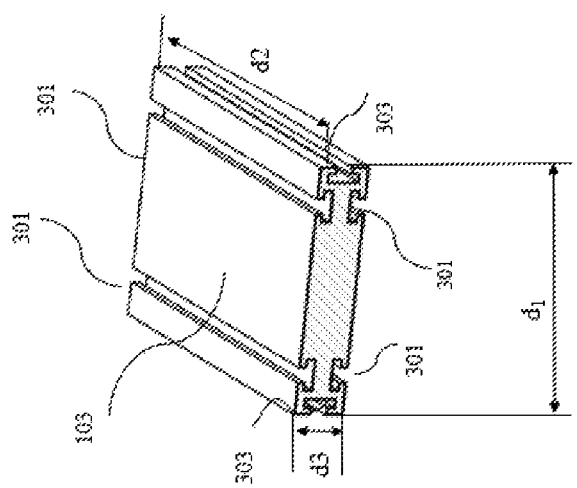
FIG. 3 is a front and side perspective view of a plate of the assembleable platform in FIG. 1(a).

Referring to FIG. 3, in one embodiment, plate 103 has two T-shaped slots 301 on the top surface and two T-shaped slots 301 on the bottom surface, and one T-shaped slot 303 on each side of first plate 103. An ordinary skill in the art understands that the number of slots on the top surface, on the bottom surface, on the left side surface and on the right-side surface can be different from the above-mentioned numbers, which is based on the design requirements of assembleable platform 100. For example, in one embodiment, plate 103 may only have one T-shaped slot 301 on the top surface. In one embodiment, plate 103 may only have one T-shaped slot on the bottom surface. In one embodiment, plate 103 may only have more than two T-shaped slots 301 on the top surface. In one embodiment, plate 103 may only have more than two T-shaped slots on the bottom surface. An ordinary skill in the art understands that the present disclosure is not limited to the number of slots on the top surface, the bottom surface, the left-side surface, and the right-side surface, which can be modified or designed in accordance with the actual design requirements of assembleable platform 100. Also, the dimensional sizes of the T-shaped slot can be modified or designed in accordance with the actual design requirements of assembleable platform 100.

Similarly, each of front left end plate 109, front right end plate 113, back left end plate 101 and a back right end plate 117 can have similar designs to that of first plate 103. The similarities of the design include, but is not limited to, the number of the T-shaped slots and the dimensional sizes of the T-shaped slots.

Referring back to FIG. 3, plate 103 has a total width d1, a total length d2, and a total height d3.

Figure 4:
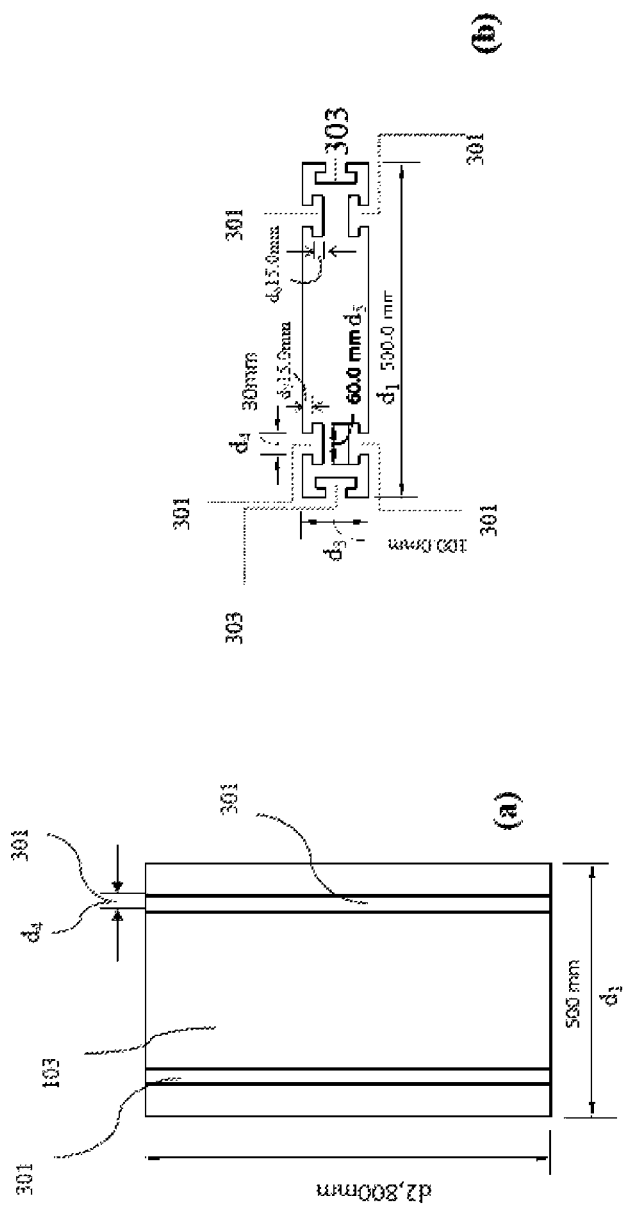
FIG. 4(a) is a top view of the plate in FIG. 3.
FIG. 4(b) is a side view of the plate in FIG. 3.

FIG. 4(a) is a top view of the plate in FIG. 3. FIG. 4(b) is a side view of the plate in FIG. 3.

Referring to FIG. 4(a), T-shaped slot 301 has a width d4. In one embodiment, the width d1 is about 500.00 mm, and the length d2 is about 800. mm.

Referring to FIG. 4(b), plate 103 has a height d3. T-shaped slot 301 has a first opening with a width d4 and a height d7. T-shaped slot 301 has a second opening. The second opening has a width d5 and a height d6. In one embodiment, width d4 is about 30.0 mm, width d5 is about 60.0 mm. In one embodiment, height d6 is about 15.0 mm, and height d7 is about 15.0 mm.

Figure 5:
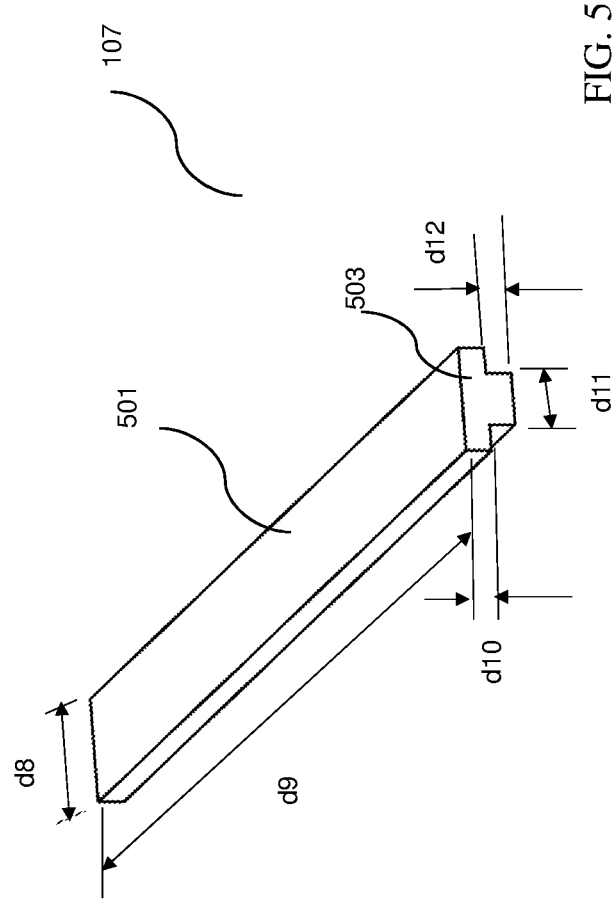
FIG. 5 is a front and side perspective view of a T-shaped connector of the assembleable platform in FIG. 1.

FIG. 5 is a front and side perspective view of a T-shaped connector of the assembleable platform in FIG. 1(a). Referring to FIG. 5, T-shaped connector 107 has a first rectangular bar 501 having a width d8, a height d10 and a length d9. T-shaped connector 107 also has a second rectangular bar 503 having a width d12, a height d10 and a length d9. Width d8 of first rectangular bar 501 matches with width d5 of the second opening, and height d9 matches with height d6 of the second opening. Width d11 of second rectangular bar 503 matches with width d4 of the first opening, and height d12 of second rectangular bar 503 matches with height d7 of the first opening. The terms "matches with" means the geometry difference is within about 0.01-0.5 mm. In general, the gap formed between the T-shaped slot and a T-shaped connector is within 0.1 mm. Also, the gap formed between the T-shaped slot and an I-beam connector is within 0.2 mm. An ordinary skill in the art understands that the geometrical dimensions of the T-shaped connector or the I-beam connector are generally smaller than these of the T-shaped slot so that the T-shaped connector can be disposed inside the T-shaped slot.

Figure 6:
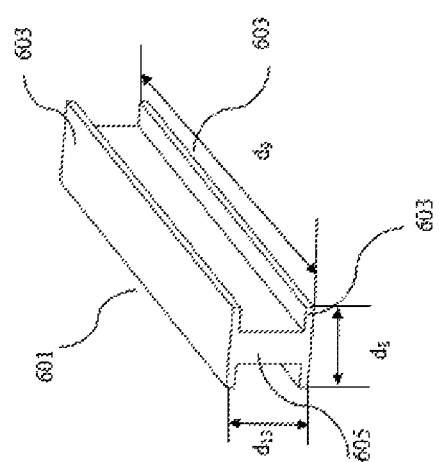
FIG. 6 is a front and side perspective view of an I-beam connector of the assembleable platform in FIG. 1.

FIG. 6 is a front and side perspective view of an I-beam connector of the assembleable platform in FIG. 1(a). Referring to FIG. 6, I-beam connector 601 has a top and a bottom horizontal rectangular bars 603 and a middle vertical rectangular bar 605 disposed between the top and bottom horizontal rectangular bars 603. I-beam connector 601 has a length of d15, a width of d14 and a height of d13.

Figure 7:
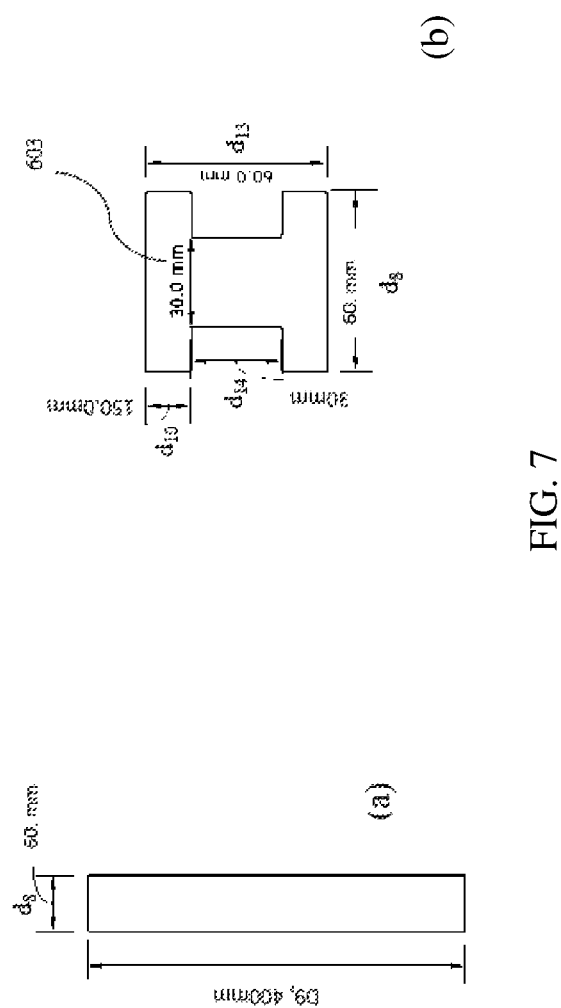
FIG. 7(a) is a top view of the I-beam connector of FIG. 6.
FIG. 7(b) is a side view of the I-beam connector of FIG. 6.

FIG. 7(a) is a top view of the I-beam connector in FIG. 6. FIG. 7(b) is a side view of the I-beam connector in FIG. 6. Referring to FIG. 7(a), in one embodiment, length d9 is about 400.0 mm. Each of top and bottom horizontal rectangular bars 603 has a height d10 about 15 mm, and has a width d8 about 60 mm. Middle vertical rectangular bar has a height d14 about 30 mm and has a width about 30 mm. In one embodiment, each of the dimensional sizes of the I-beam connector can be half or double of the dimensional sizes described in FIG. 7, or any number in accordance with the design requirements.

An ordinary skill in the art understands that I-beam connector 601 can have different dimensional sizes. The shapes of top and bottom horizontal rectangular bars 603 and the middle vertical rectangular bar do not have to be rectangular. For example, the shape can be square instead of being rectangular. The length of I-beam connector 601 can be shorter than 400 mm or longer than 400 mm, depending on the actual requirements of the design.

Figure 8:
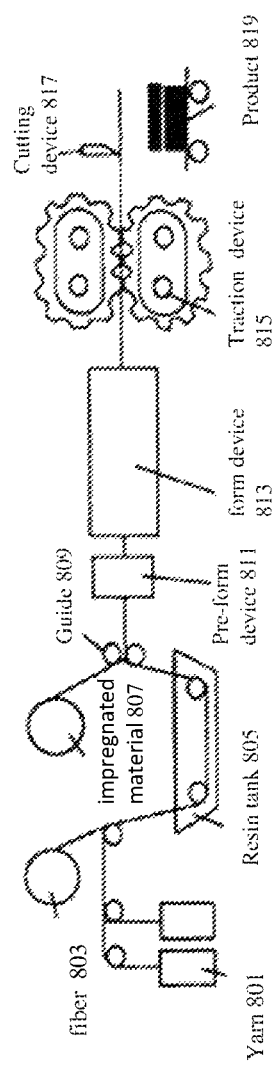
FIG. 8 is an exemplary embodiment of protrusion process of FRP.

FIG. 8 is an exemplary embodiment of a protrusion process of FRP, which is illustrated below. FRP materials have the advantages of high mechanical strength, light weight, corrosion resistance and high temperature resistance, heat insulation, smooth inner surface, easy formation of complex shapes, easy repair and cost efficiency. Basically, FRP is composed of a thermosetting resin and glass fibers.

There are many forms of pultrusion with many classification methods such as batch and continuous, vertical and horizontal, wet and dry, crawler traction and gripping traction, in-mold curing and in-mold gel mold curing. Heating methods are electric heating, infrared heating, high Frequency heating, microwave heating or combined heating. Different from other production process, in the protrusion process of FRP, external force draws dipped glass fiber-reinforced plastic fiber or fabric. Specifically, during the pultrusion process, a glass fiber roving is continuously subjected to dipping, extrusion molding, heat curing, and fixed length cutting, and then to continuously produce an FRP linear product under external force traction. The pultrusion process can continuously produce composite profiles by impregnating the crepe-free glass fiber rovings and other continuous reinforcing materials, polyester surface felts, etc., and then maintain the shape of the cross-section. It is continuously discharged after molding in the mold, thereby forming an automated production process of the pultrusion product. Again, FRP produced by the pultrusion process have higher tensile strength than ordinary steel. The resin-rich layer on the surface makes it have good corrosion resistance, so it can be a product to replace steel in engineering with corrosive environment. The pultrusion process for the FPR is further described below with reference to FIG. 8.

Pultrusion Process

A typical process of pultrusion is: (1) threading; (2) resin impregnation; (3) pre-form (4) molding and curing; and (5) traction cutting.

(1) Threading

A yarn 801 is a process in which the reinforcing material mounted on the creel is taken out from the bobbin and evenly arranged.

The yarn discharge system includes, for example, a creel, a felt spreader, a winding machine or a knitting machine.

When the reinforcing material is conveyed and discharged, in order to smooth the yarn, a rotating mandrel is generally utilized, and fiber 803 is taken out from the outer wall of the bobbin, so that the twisting phenomenon can be avoided (2) Resin Impregnation Resin impregnation is a process of uniformly immersing the tidy reinforcing fibers on the prepared unsaturated resin, generally by passing the fibers 803 through a resin tank 805. Generally, resin impregnation is divided into: straight groove dipping method and drum impregnation method. The straight groove dipping method is commonly used. During the entire impregnation process, the fibers are required to be arranged neatly.

(3) Pre-Form

The pre-impregnated reinforcing material 807 passes through the preforming device 811 via a guide 809 and operates in a continuous manner to ensure their respective positions, and the pre-impregnated reinforcing material is gradually formed into the shape of the profile through the preforming device 811 while extruding excess resin and then entering the mold.

(4) Molding and Curing

The dip-reinforced material that becomes a profile shape enters the mold and is solidified in the mold. The molding system can include a form device 813.

The temperature of the mold is designed according to the curing process. Specifically, the temperature is mainly based on the exothermic curve of the resin in the curing and the friction properties of the material and the mold.

The mold is typically divided into three different heating zones: a preheat zone, a gel zone, and a cure zone to control the cure rate.

Molding and curing are critical parts of the pultrusion process. Typical mold lengths range from 500 to 1500 mm. There must be a certain distance between the die exit and a traction device 815. The profile is typically cooled by air cooling.

(5) Traction Cutting

The traction device 815 can be a track-type tractor that pulls the cured profile out of the mold and should generally have a pull force of more than 10 tons. A hydraulic drawing machine can also be used. Product 819 is produced after going through a cutting device 817.

Pultrusion Equipment

Pultrusion equipment includes the following devices below.

1. Reinforced Material Conveying System

The conveying system can be creel, fell spreading device yarn hole, etc.

2. Resin Tank 805

In the protrusion process, a straight tank dipping method is commonly used, and the fiber and felt arrangement should be very neat throughout the impregnation process in resin tank 805.

3. Pre-Forming Device

The impregnated reinforcing material passes through the pre-forming device 811 and is carefully conveyed in a continuous manner to ensure their relative position, gradually approaching the final shape of the product 819, and extruding excess resin before entering the mold. Molded and cured.

4. Mold

The mold is designed under the conditions determined by the system. According to the resin curing exotherm curve and the friction properties of the material and the mold, the mold is divided into three different heating zones, the temperature of which is determined by the performance of the resin system. The mold is a critical part of the pultrusion process. Typical mold lengths range from 0.6 to 1.2 m.

5. Traction Device 815

The traction device itself can be a crawler type puller or two reciprocating clamping devices to ensure continuous motion.

6. Cutting Device 817

The profile is cut by a cutting saw that is automatically synchronized and moved to the required length.

Pultrusion Process Raw Materials (1) Resin Matrix;

Pultruded FRP mainly uses unsaturated polyester resin and vinyl ester resin. Other resins also use resins such as phenolic resin, epoxy resin and methacrylic acid. In recent years, due to the fire-resistant properties of phenolic resins, phenolic resins suitable for pultrusion of FRP have been developed, and second-generation phenolic resins have been promoted. In addition thermosetting resin, a thermoplastic resin is also used as needed.

(2). Reinforcement Materials

The reinforcing materials used in pultrusion can be basalt fiber, glass fibers, followed by polyester fibers. In the present disclosure, particularly, basalt fiber can be used. High-strength fibers such as carbon fiber are mainly used in aerospace and sports equipment. The Fibre-Reinforced materials used for pultrusion of FRP, mainly E glass fiber rovings, can also be selected according to the needs of the product C glass fiber, S glass fiber, T glass fiber, and AR glass fiber. In addition, synthetic fibers such as carbon fiber, aramid fiber, polyester fiber, and vinylon can be used for the purpose of special purpose products. In order to increase the transverse strength of the hollow article, continuous fiber mat, cloth, tape, or the like may also be used as the reinforcing material.

(3). Auxiliary Material Includes the Following Materials:

(a) Initiator

The characteristics of the initiator are usually expressed in terms of active oxygen content, critical temperature, and half-life. Currently commonly used initiators are:

MEKP (methyl ethyl ketone peroxide)
TBPB (tert-butyl peroxybenzoate)
BYO (benzoyl peroxide)
Lm-P (pure squeezing special curing agent)
TBPO (tort-butyl peroxyoctanoate)
BPPD (diphenoxyethyl peroxydicarbonate)
P-16 [bis (4-tert-butylcyclohexyl peroxydicarbonate)

In practice, it is rarely used in single components, usually in two or three components at different critical temperatures.

(b) Epoxy Resin Curing Agent

Commonly used agents are acid anhydrides, tertiary amines, and imidazole curing gents.

(c) Colorant

The colorant in the pultrusion generally appears in the form of a pigment paste.

(d) Filler

The filler can reduce the shrinkage rate of the product, improve the dimensional stability, surface smoothness, smoothness, flatness or no lightness of the product; effectively adjust the viscosity of the resin; can meet different performance requirements, improve wear resistance, improve electrical conductivity and Thermal conductivity, etc., most of the fillers can improve the impact strength and compressive strength of the material, but cannot improve the tensile strength; can improve the coloring effect of the pigment; some fillers have excellent light stability and chemical resistance; can reduce the cost. It is best to choose a gradient of the particle size of the filler to achieve the best results. There are also surface treatments for fillers to increase the amount.

(e) Release Agent

The release agent has an extremely low surface free energy and can uniformly wet the surface of the mold to achieve a release effect. The excellent demolding effect is the main condition for ensuring the smooth progress of the pultrusion process.

The early pultrusion process used an external release agent, and silicone oil was commonly used. However, the amount of the product is large and the surface quality of the product is not satisfactory, and an internal mold release agent has been used.

The internal mold release agent is directly added to the resin, and is oozing out from the resin matrix to the surface of the cured product under a certain processing temperature condition, and forming a separator between the mold and the product to release the mold.

The internal mold release agent generally has a phosphate ester, a lecithin, a stearate, a triethanolamine oil or the like. In pultrusion production, it is generally preferred to use an internal mold release agent that is liquid at room temperature. Most of the available internal mold release agents are primary amines, secondary amines, and mixtures of organic phosphate esters with fatty acid copolymers Pultrusion Process Control The control of pultrusion process conditions has a great influence on the stability of production and the quality of the products. The control process conditions mainly include dipping time, resin temperature, cavity temperature, cavity pressure, curing speed, curing degree, traction tension and Speed, number of yarns, etc. Details of the control process conditions have been presented below.

(1) Dipping Time:

Dipping time refers to the time taken for the roving and its fabric to pass through the resin tank. The length of time should be soaked with, for example, glass fiber, which is related to the viscosity and composition of the glue. Generally, the dipping time of the unsaturated polyester resin is controlled to be 15-20 seconds.

(2) Forming Temperature

In the pultrusion process, the glass fiber and the fabric impregnated with the glue are cross-linked by heat when passing through the mold, and the resin is gradually changed from a linear liquid object to a solid type solid body. This change is substantially completed before entering the mold and before entering the tractor. When the formulation is determined, temperature is the focus of the pultrusion process control.

A. Cavity Temperature

The resin system used for pultrusion is sensitive to temperature. Accordingly, the control of the cavity temperature is very strict. When the temperature is low, the resin can't be cured; when the temperature is too high, the blank will solidify as soon as it enters the mold, which makes molding and traction difficult. In severe cases, it will produce waste or even damage the equipment. The cavity distribution temperature should be high at both ends and low in the middle.

B. Mold Temperature Control

The mold is generally artificially divided into three sections, namely a heating zone, a gelling zone and a solidification zone. Three sets of heating plates are used on the mold to heat the mold, and the temperature is strictly controlled. During the heating process, the temperature gradually increases and the viscosity decreases. After passing through the heating zone, the resin system begins to gel and solidify. At this time, the viscous resistance at the interface between the product and the mold increases, the boundary condition of the zero speed on the wall surface is broken, and the substantially solidified profile rubs on the surface of the mold at a uniform speed. After solidification after leaving the mold, the profile continues to solidify in the drying tunnel to ensure sufficient cure when entering the tractor.

C. Mold Heating Conditions are Determined

The heating conditions of the mold are determined based on the resin-initiator system. General purpose unsaturated polyester resins generally use organic peroxides as initiators, and the set curing temperature is generally slightly higher than the critical temperature at which organic peroxides decompose. If a synergistic initiator system is employed, the initiation cure temperature of the initiator is lower under the action of the promoter. The amount of initiator used is usually determined by the exothermic curve of the unsaturated polyester resin cure, and the amount of curing agent for the epoxy resin can be calculated.

D. Mold Temperature Control

The temperature in the heating zone can be lower, and the gel zone is similar to the temperature in the solidification zone. The temperature distribution should be such that the solidification exothermic peak appears in the middle of the mold, and the gelation solidification demarcation point should be controlled in the middle of the mold. Generally, the temperature difference of the three sections is controlled at about 10-20° C., and the temperature gradient should not be too large. The temperature setting is closely related to the formulation, the pulling speed, the size and form of the mold.

E. Cavity Pressure

The cavity pressure is due to the viscosity of the resin, the friction between the product and the cavity wall, the volume expansion of the material due to heat, and the partial vaporization of the material. Therefore, the cavity pressure provides a comprehensive reflection of the behavior of the article within the cavity. Generally, the cavity pressure is between 1.7 and 8.6 MPa.

(3) Tension and Traction

Tension is the force at which the glass fiber roving is tensioned during pultrusion. The glass fiber roving after dipping can be made loose. The size is related to the distance between the rubberizing roller in the glue tank and the inlet of the mold, and also related to the shape and resin content of the pultrusion product. In general, it should be determined experimentally according to the geometry and size of the specific product. The change in traction reflects the reaction state of the product in the mold and is related to many factors such as fiber content, geometry and size of the product, release agent, mold temperature, pultrusion speed, and the like.

(4) Traction Speed

Traction speed is a parameter that balances the degree of solidification and production speed. The traction speed should be increased as much as possible while ensuring the degree of cure.

Figure 9:
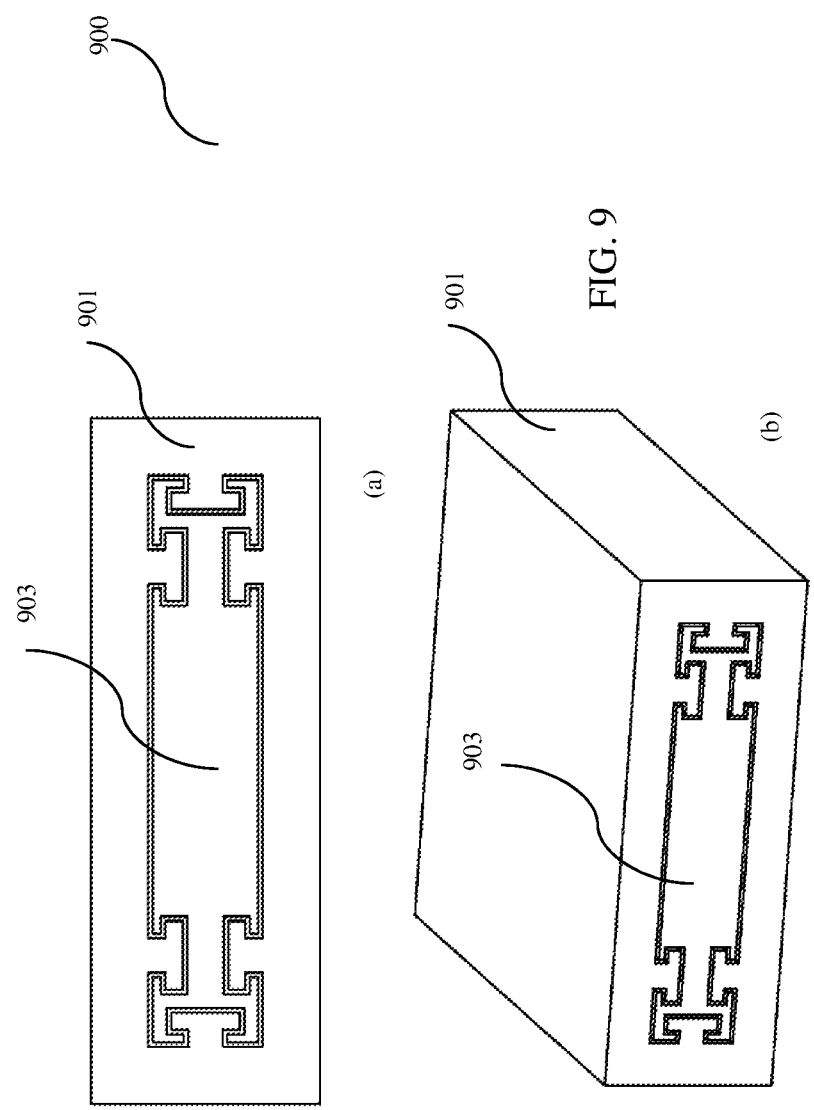
FIG. 9(a) is a front view of a mold of the plate in FIG. 3.
FIG. 9(b) is a front and side perspective view of the mold of FIG. 9(a).

FIG. 9(a) is a front view of a mold of the plate in FIG. 3. FIG. 9(b) is a front and side perspective view of the mold of FIG. 9(a).

Referring to FIG. 9(a) and FIG. 9(b), mold 900 has an outer mold part 901 and an inner mold part 903. The gap between outer mold part 901 and inner mold part 903 forms a plate of the assemblable platform. The gap can be 2, 3, 4 mm or more. In one embodiment, mold 900 may only has an outer mold part 901.

Figure 10:
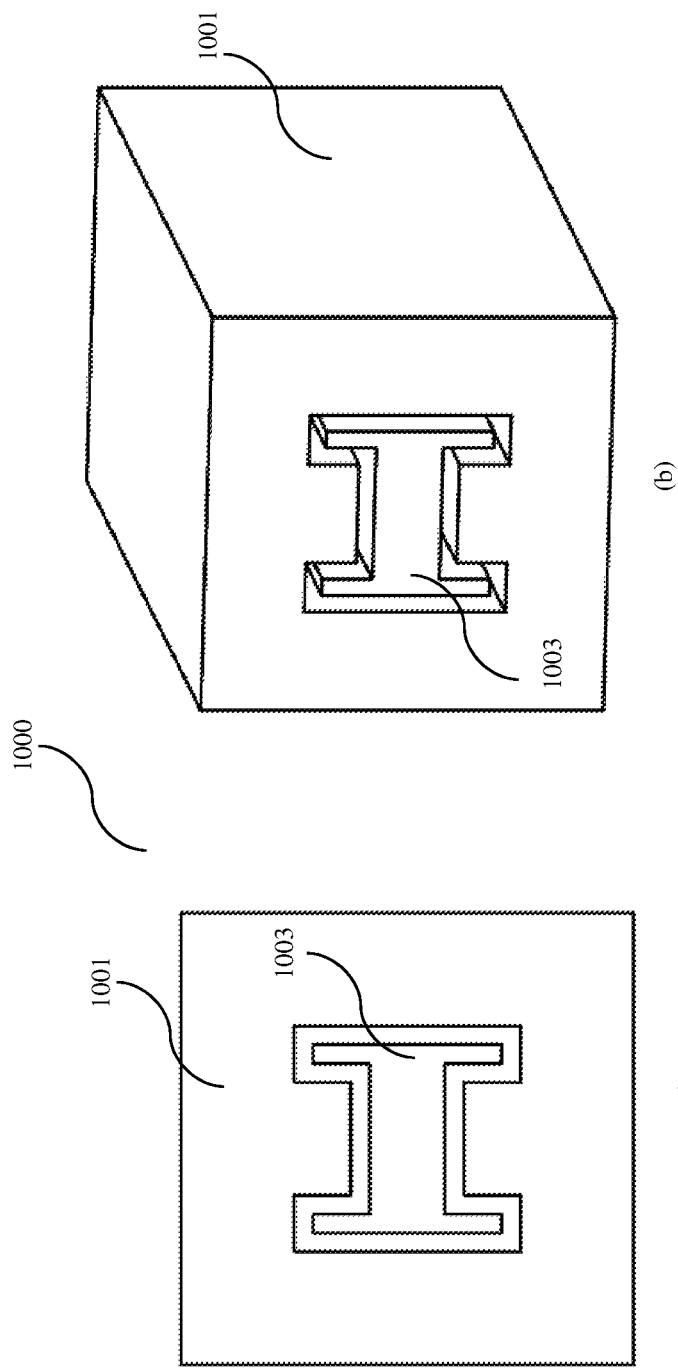
FIG. 10(a) is a front view of a mold of an I-beam connector with a cavity in the center of the I-beam connector.
FIG. 10(b) is a front and side perspective view of the mold of the I-beam connector of FIG. 10(a).

FIG. 10(a) is a front view of a mold of an I-beam connector with a cavity in the center of the I-beam connector. FIG. 10(b) is a front and side perspective view of the mold of the I-beam connector of FIG. 10(a).

Referring to FIG. 10(a) and FIG. 10(b), mold 1000 has an outer mold part 1001 and an inner mold part 1003. The gap between outer mold part 1001 and inner mold part 1003 forms an I-beam connector of the assemblable platform. The gap can be 2, 3, 4 mm or more. In one embodiment, mold 900 may only has an outer mold part 1001.

Figure 11:
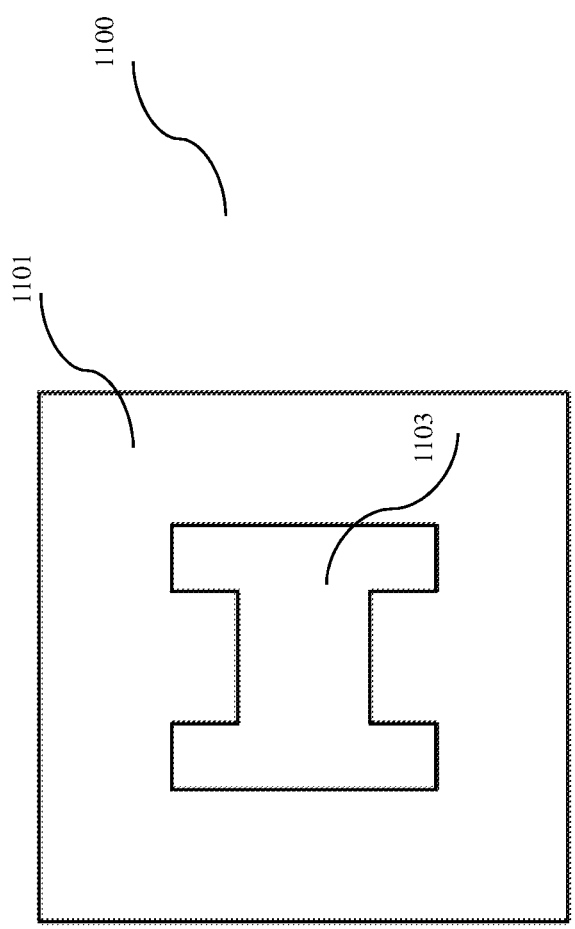
FIG. 11(a) is a front view of a mold of the I-beam connector of FIG. 6.

FIG. 11(*a*) is a front view of a mold of the I-beam connector of FIG. 6. Mold 1100 only has an outer part 1101 with an inner part 1103 being removed. The dimensional sizes of inner part 1103 that is removed from the mold can be referred to FIGS. 6 and 7 of the present disclosure.

Figure 12:
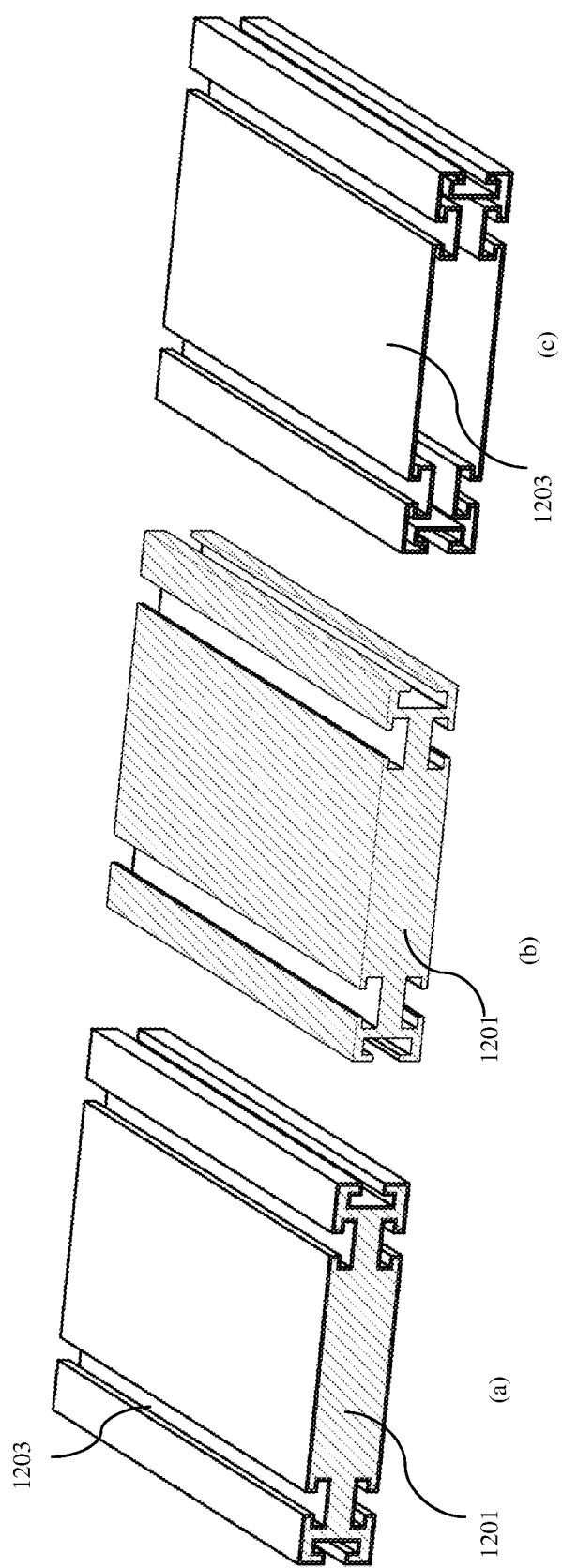
FIG. 12(a) is a front and side perspective view of an I-beam connector of the assembleable platform in FIG. 1 with a filled material.
FIG. 12(b) is a front and side perspective view of the filled material in FIG. 8(a).
FIG. 12(c) is a front and side perspective view of the I-beam connector of the assembleable platform in FIG. 1 without the filled material.

FIG. 12(*a*) is a front and side perspective view of a plate of the assembleable platform in FIG. 1(*a*) with a filled material. Referring to FIG. 12(*a*), plate 1203 has a filled material 1201. The purpose of filled material 1201 is to decrease the weight of plate 1203 while still maintaining the strength and stiffness of plate 1203 substantially. FIG. 12(*b*) is a front and side perspective view of the filled material in FIG. 12(*a*). FIG. 12(*c*) is a front and side perspective view of the plate the assembleable platform in FIG. 1(*a*) without the filled material.

Figure 13:
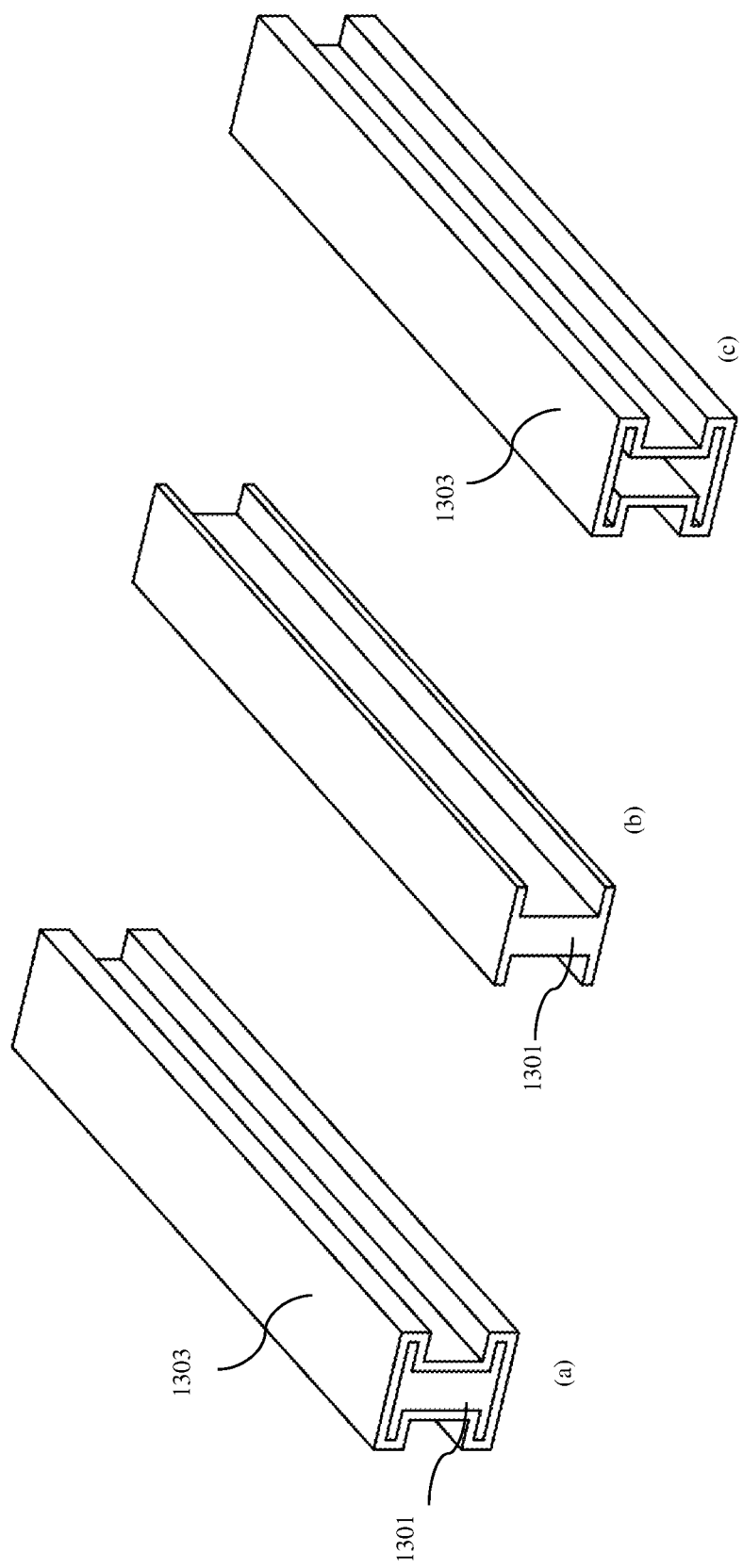
FIG. 13(a) is a front and side perspective view of one embodiment of a T-shaped connector with a compressible material.
FIG. 13(b) is a front and side perspective view of one embodiment of an I-beam connector made of a compressible material.

FIG. 13(*a*) is a front and side perspective view of an I-beam connector of the assembleable platform in FIG. 1(*a*) with a filled material. FIG. 12(*b*) is a front and side perspective view of the filled material in FIG. 8(*a*). FIG. 12(*c*) is a front and side perspective view of the I-beam connector of the assembleable platform in FIG. 1(*a*) without the filled material.

In the present disclosure, the filled materials can be Polyurethane (PU) or Expanded polystyrene (EPS).

The foaming processes of PU and EPS are descried below, respectively.

Specifically, PU products are polymer polyols and isocyanates plus various additives to adjust the foaming density, tensile strength, wear resistance, elasticity, etc. PU products then are fully mixed with PU machine and then injected into the mold to expand the chain and react in the cavity of the plate or I-beam connector of the assembleable platform.

Foaming Process of PU

Prepolymer Method

The prepolymer foaming process is to prepare (white material) and (black material) into a prepolymer, and then add a talyst, a surfactant, other additives, etc. in the prepolymer to be mixed under high speed stirring. After the mixture is cured in the space where the foam needs to be filled, it can be matured at a certain temperature.

Semi-Prepolymer Method

The foaming process of the semi-prepolymer method is to first form a part of the polyether polyol (white material) and the diisocyanate (black material) into a prepolymer, and then another part of the polyether or polyester polyol and the diisocyanate, water. A catalyst, a surfactant, other additives, and the like are added, and the mixture is foamed under high-speed stirring.

One-Step Foaming Process

The polyether or polyester polyol (white material) and polyisocyanate (black material), water, catalyst, surfactant, foaming agent, other additives and the like are added in one step, mixed under high-speed stirring, and then foamed.

A one-step foaming process is a commonly used process. There is also a manual foaming method, which is an easy way to accurately weigh all the raw materials, put them in a container, and then immediately mix them evenly into the mold or the space where the foam needs to be filled.

The polyurethane rigid foam is generally foamed at room temperature, and the molding process is relatively simple. According to the degree of construction mechanization, it can be divided into manual foaming and mechanical foaming; according to the pressure during foaming, it can be divided into high pressure foaming and low-pressure foaming; according to the molding method, it can be divided into casting foaming and spray foaming.

The following description is directed to EPS.

EPS has a relatively low density (1.05 g/cm3), low thermal conductivity, low water absorption, impact vibration resistance, heat insulation and sound insulation. It has the advantages of moisture proof, vibration reduction and excellent dielectric properties. EPS products are generally safe and non-toxic. With the rapid development of the global economy, the amount of polystyrene foam is increasing. These waste polystyrene foams are light in weight and large in volume, and are inherently resistant to aging and corrosion. Specifically, EPS is a rigid cellular foam of polystyrene (PS) with good heat insulation and shock absorption, high compressive strength, very light weight and moisture resistance. Its uses include building insulation and sound insulation, side walls and Covering of inner walls, packaging materials and disposable packaging containers.

Foaming Process of EPS

The EPS particles are produced by a suspension method and a blowing agent under pressure. Usually pentane causes the resin to foam during the molding process. There are two processes—extrusion or water vapor molding. The one-step extrusion route utilizes direct thermal extrusion of the material after foaming, and this method is used most for sheet and film manufacturing. The two-step steam molding method is to pass the foaming agent through polystyrene particles during or after polymerization, and the particles are then heated by water vapor to a temperature higher than its glass transition temperature to expand them by about 40-80 times. As a result, the honeycomb structure of EPS is formed and molded.

In the present disclosure, the filled material can be either PU or EPS through the foaming process, as described above.

Figure 14:
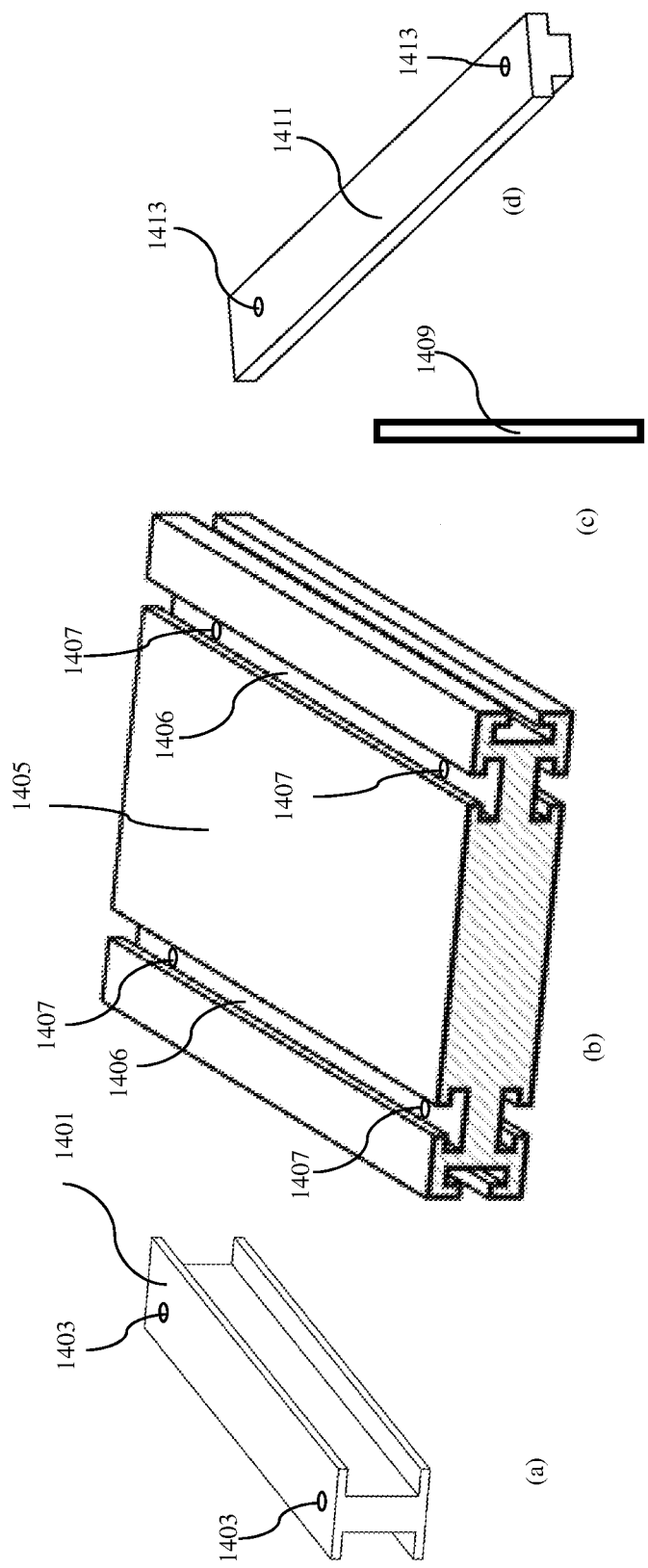
FIG. 14(a) is a front and side perspective view of one embodiment of an I-beam connector with through holes.
FIG. 14(b) is a front and side perspective view of one embodiment of a plate with through holes.
FIG. 14(c) is a pin for connecting the I-beam connector of FIG. 14(a) and the plate of FIG. 14(b).
FIG. 14(d) is a front and side perspective view of one embodiment of a T-shaped connector with through holes.

FIG. 14(*a*) is a front and side perspective view of one embodiment of an I-beam connector with through holes. FIG. 14(*b*) is a front and side perspective view of one embodiment of a plate with through holes. FIG. 14(*c*) is a pin for connecting the I-beam connector of FIG. 14(*a*) and the plate of FIG. 14(*b*). FIG. 14(*d*) is a front and side perspective view of one embodiment of a T-shaped connector with through holes.

Referring to FIG. 14(*a*), I-beam connector 1401 has two clearance holes 1403 on each end. Holes 1403 can be through hole penetrating through I-beam connector 1401.

Referring to FIG. 14(*b*), plate 1405 has four clearance holes 1407 on each corner of T-shaped slots 1406. Holes 1407 can be through holes or do not penetrate through T-shaped slots 1406.

Referring to FIG. 14(*c*), FIG. 14(*c*) is a pin for connecting the I-beam connector of FIG. 14(*a*) and the plate of FIG. 14(*b*). Pin 1409 will pass through hole 1403 and enters into hole 1407 so that I-beam connector 1401 will not slide along T-shaped slot 1406.

FIG. 14(*d*) is a front and side perspective view of one embodiment of a T-shaped connector with through holes. Pin 1409 will pass through hole 1413 and enters into hole 1407 so that T-shaped connector 1411 will not slide along T-shaped slot 1406.

FIG. 15(*a*) is a front and side perspective view of one embodiment of a T-shaped connector made of compressible material. FIG. 15(*b*) is a front and side perspective view of one embodiment of an I-beam connector made of compressible material.

FIG. 15(*a*) and FIG. 15. (*b*) describe another way of preventing the I-beam connector and/or T-shaped connector to slide along the T-shaped slots. Both T-shaped connector 1501 and I-beam connector 1503 are made of compressible material and can be inserted into T-shaped slots, for example, T-shaped slot 1406, so that the T-shaped connector and/or the I-beam connector will be against movements of T-shaped connector 1501 or I-beam connector 1503. Because T-shaped connector 1501 or I-beam connector 1503 has dimensions larger than the dimensional sizes of the T-shaped slots. After T-shaped connector 1501 or I-beam connector 1503 is squeezed into the T-shaped slot, the T-shaped connector and/or the I-beam connector will not slide along the T-shaped slot.

FIG. 16 shows a method of assembling the assembleable platform. Referring to FIG. 16, in one embodiment, assembleable platform 100 can have more than one layer. For example, two assembleable platforms 100 can be stacked along a z axis direction with I-beam connectors 501. Two assembleable platforms 100 can be connected with each other along the x axis direction with I-beam connectors 501. Two assembleable platforms 100 can be connected with each other along the y axis direction with T-shaped connectors 601.

In the present disclosure, asssembleable platform 100 can be assembled or disassembled easily. No traditional mechanical connection means such as bolts or glues is utilized.

The foregoing description of the exemplary embodiments of the present disclosure has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. An assembleable platform made of fiber-reinforced plastic (FRP), comprising,
a first plurality of plates each comprising a first T-shaped slot on the top surface and a second T-shaped slot on the bottom surface along a first axis, and a third T-shaped slot on the right-side surface and a fourth T-shaped slot on the left-side surface along the first axis and orientated perpendicular to the first axis;
a plurality of T-shaped connectors disposed in the first T-shaped slot and the second T-shaped slot to connect the first plurality of the plates;
a first plurality of I-beam connectors disposed in the third T-shaped slot and the fourth T-shaped slot to connect the first plurality of plates to form the assembleable platform,
wherein each of the first plurality of plates, the plurality of T-shaped connectors and the first plurality of I-beam connectors has the same or substantially the same thickness and is made of FRP.

2. The assembleable platform of claim 1, wherein each of the first plurality of plates has a fifth T-shaped slot on the top surface of the each plate and a sixth T-shaped slot on the bottom surface of the each plate.

3. The assembleable platform of claim 2, wherein a first clearance between each T-shaped connector and each T-shaped slot is within 0.1 mm when the each T-shaped connector is disposed on the each T-shaped slot; and a second clearance between each I-beam connector and each T-shaped slot is within 0.2 mm when the each I-beam connector is disposed in the each T-shaped slot.

4. The assembleable platform of claim 2, wherein the each plate has a length, and the length is about 800.0 mm.

5. The assembleable platform of claim 2, wherein the each plate has a thickness, and the thickness is about 100.0 mm.

6. The assembleable platform of claim 2, wherein the each plate has a central cavity, and the central cavity is filled with either polystyrene (PU) or expanded polystyrene (EPS) through a foaming process.

7. The assembleable platform of claim 1, wherein each I-beam connector has a central cavity, and the central cavity is filled with PU or EPS through the foaming process.

8. The assembleable platform of claim 1, wherein each T-shaped connector has a central cavity, and the central cavity is filled with PU or EPS through the foaming process.

9. The assembleable platform of claim 8, wherein at least one of the first plurality of plates has a clearance hole disposed on a corresponding T-shaped slot, and the clearance hole is to insert a first pin.

10. The assembleable platform of claim 1, wherein each I-beam connectors has at least one through hole, and the at least one through hole is to mechanically fix the each I-beam connector with a first corresponding plate by a second pin.

11. The assembleable platform of claim 1, wherein each T-shaped connector has at least one through hole, and the through hole is to mechanically fix the each T-shaped connector with a second corresponding plate through a third pin.

12. The assembleable platform of claim 11, further comprising at least two T-shaped connectors made of a compressible material, wherein the at least two T-shaped connectors made of the compressible material are disposed in one of T-shaped slots of the first plurality of plates of the assembleable platform.

13. The assembleable platform of claim 12, wherein the each T-shaped connector made of FRP has one T-shaped connector made of the compressible material disposed one each side of the each T-shaped connector made of FRP.

14. The assembleable platform of claim 13, wherein the each I beam connector made of FRP has one I beam connector made of the compressible material disposed one each side of the each T-shaped connector made of FRP.

15. The assembleable platform of claim 14, further comprising an I-beam connector made of the compressible material, wherein the I-beam connector made of the compressible material is disposed in one of T-shaped slots of the first plurality of plates of the assembleable platform.

16. The assembleable platform of claim 1, wherein the assembleable platform has a total length greater than 2.0 meters and a total thickness greater than 100.0 mm, and the assembleable platform has a buoyance force when the assembleable platform is put in water and the buoyance force is large enough to support at least a person with a weight over 300 lb.

17. The assembleable platform of claim 1, wherein reinforcing material of the FRP is basalt fiber.

18. The assembleable platform of claim 1, wherein the assembleable platform has at least one layer, and a second plurality of plates on a top layer are connected with a third plurality of plates of the adjacent layer under the top layer through a second plurality of I-beam connectors.

19. The assembleable platform of claim 18, wherein the assembleable platform can be connected with another assembleable platform by another plurality of T-shaped connectors in either an X axis or a y-axis direction.

20. The assembleable platform of claim 1, wherein the each plate is rectangular.

* * * * *